United States Patent [19]
Bunyea

[11] Patent Number: 4,871,629
[45] Date of Patent: Oct. 3, 1989

[54] LATCHING ARRANGEMENT FOR BATTERY PACKS

[75] Inventor: Roderick F. Bunyea, Westminster, Md.

[73] Assignee: Black & Decker Inc., Newark, Del.

[21] Appl. No.: 152,107

[22] Filed: Feb. 4, 1988

[51] Int. Cl.$^4$ .................. H01M 2/10; E05B 15/02
[52] U.S. Cl. ............................ 429/97; 429/98; 30/500; 292/341.15
[58] Field of Search ................... 429/96–99, 429/123; 30/500; 292/341.15; 307/150

[56] References Cited

U.S. PATENT DOCUMENTS

| | | | |
|---|---|---|---|
| 3,070,748 | 12/1962 | Worobey | 307/150 |
| 3,186,878 | 3/1962 | Filander | 136/173 |
| 3,194,688 | 3/1962 | Riley et al. | 136/173 |
| 3,494,799 | 2/1970 | Pedone | 136/173 |
| 3,525,919 | 8/1970 | Wise | 320/2 |
| 3,999,110 | 12/1976 | Ramstrom et al. | 320/2 |
| 4,191,917 | 3/1960 | Brown et al. | 429/97 X |
| 4,389,469 | 6/1983 | Nickolls | 429/98 |
| 4,399,201 | 8/1983 | Nagahara | 429/97 X |
| 4,429,025 | 1/1984 | Stow | 429/97 |
| 4,751,452 | 6/1988 | Kilmer et al. | 429/99 X |

FOREIGN PATENT DOCUMENTS 387688 1/1924 Fed. Rep. of Germany.

*Primary Examiner*—Stephen J. Kalafut
*Attorney, Agent, or Firm*—Dennis A. Dearing; Edward D. Murphy; Edward D. C. Bartlett

[57] ABSTRACT

A latching arrangement of latching a battery pack in an electric device. e.g. an electric drill or a battery charger, has at least one shoulder on an outside surface of the battery pack casing. A displaceable limb, preferably a limb of a U-shaped spring is resiliently biased against the casing. A manually actuatable latch release member is movably mounted in the electric device and movable between a latching position and a release position. This limb normally blocks the shoulder in the latching position to latch the battery pack in the electric device. The release member displaces the limb away from the casing and clear of the shoulder in the release position to unlatch the battery pack and allow withdrawal thereof from the electric device. Preferably the release member comprises a yoke straddling the battery pack. Advantageously the shoulder may be steeply inclined to cause the battery pack to be urged tightly into the electric device.

25 Claims, 4 Drawing Sheets

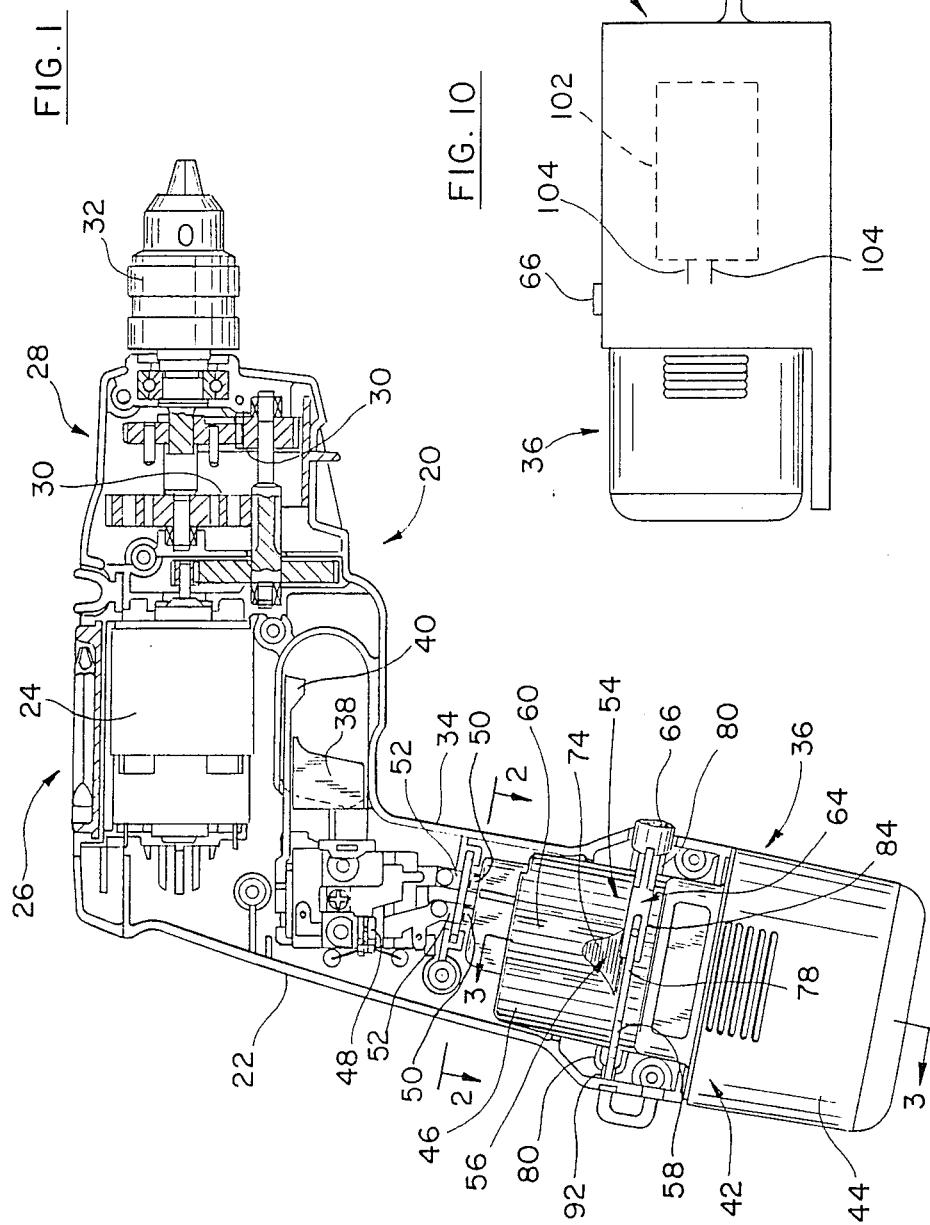

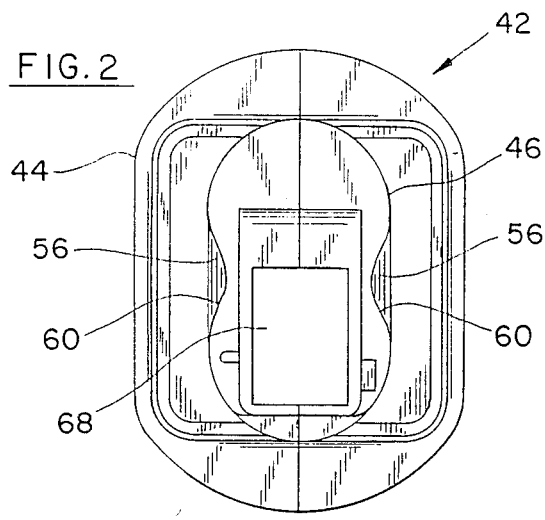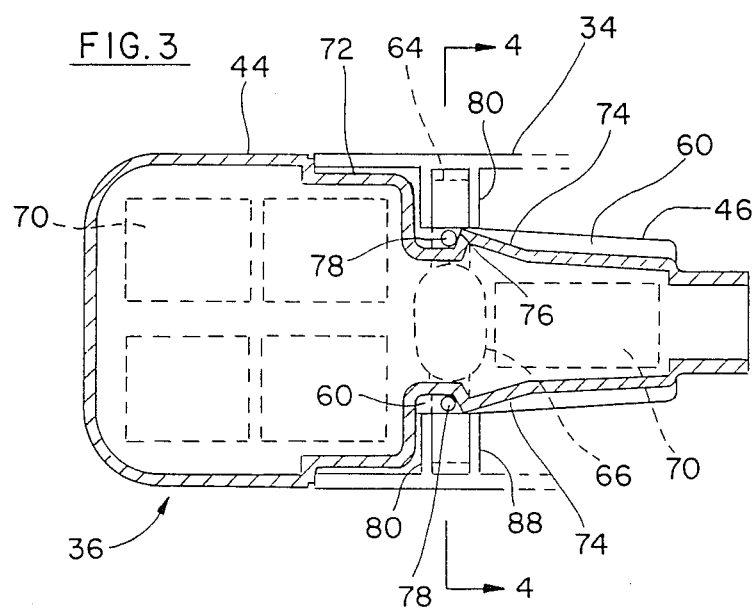

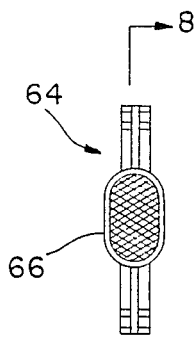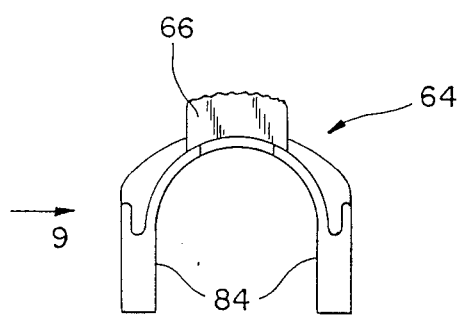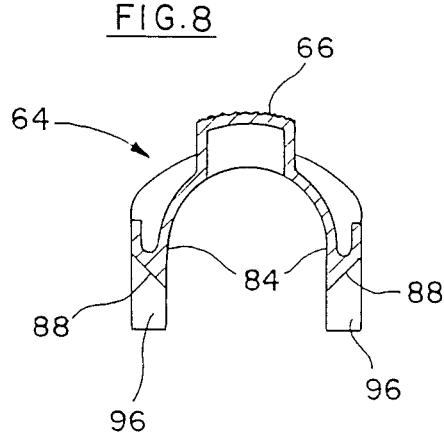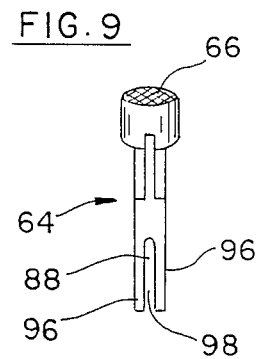

LATCHING ARRANGEMENT FOR BATTERY PACKS

FIELD OF THE INVENTION

This invention relates to latching arrangements for latching battery packs in electric devices.

BACKGROUND OF THE INVENTION

Battery packs for powering cordless devices, for example portable drills, are well known. It has been found convenient to have the battery packs releasably mounted in the cordless devices so that the battery packs can be removed for recharging. During this recharging the battery packs are placed in a charging unit connected to a source of AC supply.

While the battery packs are in place in the cordless power devices, it is desirable to latch them in position.

SUMMARY OF THE INVENTION

It is an object of the present invention to provide an improved latching arrangement for latching a battery pack in an electric device.

It is a further object of the invention to provide a simple yet effective latching arrangement.

Accordingly, there is provided by the present invention a latching arrangement for latching a battery pack in an electric device, comprising a shoulder formed on an outside surface of a casing of the battery back, and a displaceable limb mounted inside the electric device, the limb being resiliently biased towards the casing for contact therewith. A manually actuatable latch release member is movably mounted in the electric device and movable between a latching position and a release position. The limb contacts the casing and blocks the shoulder in the latching position to latch the battery pack in the electric device. The release member displaces the limb away from the casing and clear of the shoulder in the release position to unlatch the battery pack and allow withdrawal thereof from the electric device.

Preferably, the shoulder is formed at an end of a protrusion on the casing, the protrusion having a ramp which is engaged by the limb to lift the limb over the protrusion when the battery pack is inserted into the electric device.

The limb may be an arm of a U-shaped spring which straddles the casing. The release member may comprise a yoke which straddles the casing, and free ends of the U-shaped spring may engage the yoke with said U-shaped spring and the yoke encircling the casing.

The casing may have a gulley extending in a direction in which the battery pack is inserted into and withdrawn from the electric device, and the shoulder may extend transversely across this gulley.

The electric device may be a cordless power device, for example a portable power tool, or a battery pack charger for recharging the battery pack.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings, in which the same reference characters in different Figures indicate like parts:

FIG. 1 is a side elevation, with the nearside housing half removed and some internal parts shown in section, of a cordless electric drill embodying the invention;

FIG. 2 is an end view of the battery pack casing of the cordless drill taken in the direction of the line 2—2 in FIG. 1;

FIG. 3 is a section on the line 3—3 in FIG. 1 with some parts omitted for clarity and others shown in broken lines;

FIG. 6 is a top plan view of the release member of the latching arrangement as orientated in FIG. 3;

FIG. 7 is a front view of the release member when orientated as in FIGS. 4 and 5;

FIG. 8 is a section through the release member taken on the line 8—8 of FIG. 6;

FIG. 9 is a side view of the release member in the direction of the arrow 9 in FIG. 7; and FIG. 10 is a diagrammatic elevational view of a battery pack charger and battery pack according to another embodiment of the invention, the battery pack and latching arrangement being the same as in the drill embodiment of FIGS. 1 to 9.

DETAILED DESCRIPTION OF THE PREFERRED EMBODIMENTS

Figure 4:
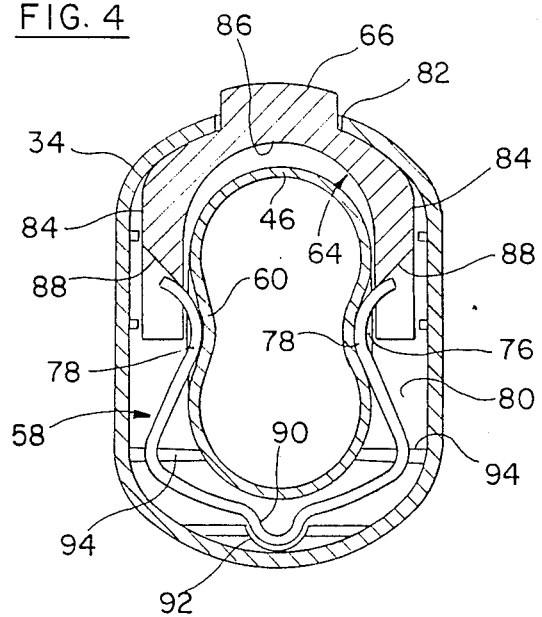
FIG. 4 is a section through the handle portion of the cordless drill of FIG. 1 taken on the line 4—4 of FIG. 3.

The preferred embodiment of the invention is directed to releasably latching a battery pack in a cordless, hand-held power tool as illustrated in FIGS. 1 to 9. However, the invention is also applicable to releasably latching the battery pack in a charger while the battery pack is being recharged, this being depicted in FIG. 10.

FIG. 1 shows a cordless drill 20 having a housing 22 containing a DC electric motor 24 in a motor compartment 26. Forward of the motor compartment 26 is a gearbox compartment 28 containing reduction gearing comprising a plurality of gears 30 through which the motor 24 rotatably drives a tool chuck 32. A pistol grip handle 34 depends downwardly from the rear of the motor compartment 26 and has a battery pack 36 inserted in its lower end. An on/off trigger switch 38 is electrically connected between the battery pack 36 and the motor 24, a motor reversing switch 40 being associated with the trigger switch 38.

The battery pack 36, which contains a plurality of rechargeable batteries, has a casing 42 of plastic material which is electrically insulating. A portion 44 of larger cross-section remains outside the drill's housing 22, and a portion 46 of smaller cross-section extends upwardly inside the handle 34 to adjacent the body 48 of the trigger-switch 38. Electrical contacts 50 extending from the extreme upper end of the battery pack 36 engage electrical contacts 52 connected to the trigger switch housing 48, these sets of contacts 50, 52 engaging and disengaging automatically when the battery pack is fully inserted into the handle 34 or slid therefrom, respectively.

Preferably, the two contacts 50 should be fully recessed inside the battery pack portion 46 adjacent an opening through the forward end of the battery pack. The contacts 50 would then be concealed male contacts and the switch contacts 52, in the form of female contacts, would extend into the battery pack to engage the contacts 50.

The battery pack 36 is releasably retained in the pistol grip handle 34 by a latch arrangement 54 which comprises resilient limbs of a retaining spring 58 engaging behind a pair of protrusions 56 (only one seen in FIG. 1) to latch the battery pack 36 in the handle 34. The protrusions 56 are formed on opposite sides of the battery pack portion 46 and extend across longitudinal gulleys 60 therein. The spring 58 is generally U-shaped and free end portions thereof slidably engage in legs 84 (only one seen in FIG. 1) of a latch release member 64 having a manually depressible button 66. Depression of the button 66 flexes the free end portions of the spring 58 apart and outwardly of the protrusions 56 to unlatch the battery pack 36 and enable it to be withdrawn from the handle 34 of the drill. This latch arrangement 54 will now be described in greater detail with reference to FIGS. 2 to 9, with some further reference to FIG. 1 in relation to some parts therein not yet described or to be further described.

FIG. 2 shows a front end view of the battery pack casing 42 as viewed in the direction of the arrows 2 in FIG. 1, all other parts of the battery pack being omitted. The outline of the larger portion 44 is somewhat rectangular with upper and lower curved sides. The smaller portion 46 is of a similar outline but has a gulley 60 midway along each side. These gulleys 60 are diametrically opposite each other and extend lengthwise for the length of the smaller portion 46 as can better be appreciated from FIG. 1. Each gulley 60 is traversed at a location partway along its length by one of the two protrusions 56. These protrusions 56 are like dams across the gulleys 60 with the top (or outer extremity) of each dam-like protrusion 56 forming a continuation of the outer periphery of the smaller casing portion 46. The front end of the smaller casing portion 46 is formed with an open mouth 68 through which the contacts 50 (see FIG. 1) extend.

FIG. 3 is a longitudinal section through the battery pack 36 and end portion of the drill's handle 34 on the line 3—3 in FIG. 1. The rechargeable nickel/cadmium batteries 70 inside the battery pack are diagrammatically illustrated in broken lines. The push button 66 and legs of the latch release member 64 are also illustrated in broken lines. The two gulleys 60 can be seen extending the length of the smaller casing portion 46 and blocked by the two protrusions 56 (FIGS. 1 and 2) near an intermediate portion 72 of the battery pack casing. Each protrusion 56 (FIGS. 1 and 2) is formed with a ramp having a smooth, forwardly an downwardly inclined surface 74 on its forward or leading side (the right in FIG. 3), and a shoulder 76 on its rear or trailing side. As can be seen, this shoulder 76 is slightly rearwardly and downwardly inclined and functions to urge the battery pack forwardly and can also aid in release of the latch arrangement. The free ends 78 of the retaining spring 58 (FIG. 1) can be seen engaged in the gulleys 60 behind the shoulders 76 to prevent withdrawal of the battery pack 36 to the left. In this way, the spring end portions 78 latch the battery pack 36 in the drill's handle 34. Forward and rear partitions 80 (see also FIGS. 1 and 4), formed integrally with the drill's housing 22, extend inwardly adjacent the rear (i.e. lower in FIG. 1) end of the pistol grip handle 34 and define opposed channels in which the legs of the latch release member 64 are slidably mounted. The channels between the partitions 80 guide the latch release member 64 but prevent movement of release member 64 in the longitudinal direction of insertion and withdrawal of the battery pack 36 into and out of the pistol grip handle 34.

As will be appreciated, due to the curved cross-section of the gulleys 60 as shown in FIG. 2, the outline shape of the ramps 74 in plan view is a bell shape as shown in FIG. 1.

FIG. 4 is a cross-section through the smaller portion 46 of the battery back casing and the lower portion of the pistol grip handle 34 on the line 4—4 in FIG. 3, some parts including the batteries being omitted for simplicity. The button 66 of the latch release member 64 protrudes outwardly through an orifice 82 in the housing wall of the pistol grip handle 34. The latch release member 64 is formed as a yoke with two legs 84 extending downwardly from the button 66 on opposite sides of the upper portion of the battery pack smaller portion 46. The internal periphery of the member 64 conforms to the outer periphery of the battery pack portion 46 at that location to enable the button 66 to be manually fully depressed until the bridging portion 86 of the yoke abuts the upper curved surface of the battery pack portion 46. Intermediate the length of each leg 84 is an upwardly and outwardly inclined cam surface 88 which is resiliently engaged by a respective free end 78 of the spring 58. As can be seen, the spring 58 is generally of U-shape with the free ends 78 being upwardly and inwardly inclined towards each other and terminating in outwardly directed curved end portions. The base of the U-shape has a central downwardly extending loop 90 which nests in a recess 92 (see also FIG. 1) in a web on the inside of the housing wall of the drill's handle 34. The limbs of the U-shaped spring 58 are supported against displacement longitudinally of the handle 34 by transverse ribs 94 formed on the partitions 80 extending inwardly from the housing wall of the handle 34 and defining the channels in which the legs 84 are slidably guided.

The spring legs 78 are biased towards each other and engage in the gulleys 60 so resiliently pressing against opposite walls of the battery pack portion 46. The outwardly curved upper ends of the spring 58 engage inwardly against the cam surfaces 88 so biasing the release member 64 upwardly into contact with the upper internal wall of the handle 34 with the button 66 protruding as shown in FIG. 4. At the same time, the upper ends of the spring 58 are engaged against and behind the shoulders 76 of the protrusions 56 (see also FIGS. 1 and 3). In this position, the battery pack 36 is latched in the pistol grip handle 34.

Figure 5:
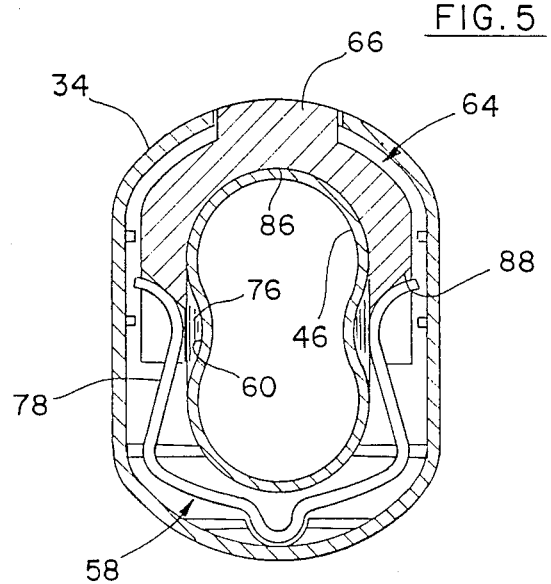
FIG. 5 is a similar section to FIG. 4 but showing the battery pack latching arrangement in the released position for removal or insertion of the battery pack.

FIG. 5 is a similar view to FIG. 4 but showing the latching arrangement in the unlatched position in which the battery pack can be readily withdrawn from the drill for charging. In FIG. 5 the button 66 has been manually depressed so moving the latch release member 64 inwardly with the bridging portion 86 of its yoke contacting and being stopped by the then abutting curved wall of the smaller portion 46 of the battery pack. During this inward movement (downward in FIG. 5) of the member 64, the cam surfaces 88 force the spring free ends 78 to move apart, that is outwardly, with the outwardly curved upper spring ends sliding upwardly and outwardly on the cam surfaces 88. The spring free ends 78 are sufficiently moved apart to completely expose the shoulders 76 as shown in FIG. 5. In other words, the legs of the spring are moved outwardly be outer peripheral extent of the protrusions 56 (see FIGS. 1 and 3). While the button 66 is fully depressed the spring 58 does not interfere with the battery pack being withdrawn from, or inserted into, the drill's handle 34.

When inserting the battery pack 36 into the handle 34, there is no need to manually depress the button 66. Instead, as the battery pack is inserted, the gradually inclined ramps 74 (see FIGS. 1 and 3) engage and move the free ends 78 of the spring 58 apart; upon completion of insertion of the battery pack, the spring free ends 78 snap behind the shoulders 76 to latch the battery pack in position.

The spring 58 is a stiff spring, and consequently it requires a strong force to deform the free ends 78 outwardly. To facilitate insertion of the battery pack 36 into the handle 34, the ramps 74 are gently inclined. The ramps 74 are inclined rearwardly and outwardly at an angle of approximately 17 degrees to the longitudinal axis of the battery pack, i.e. to the direction in which the battery pack is inserted into and withdrawn from the handle 34. Preferably, this ramp angle is in the range of 10 to 25 degrees. The steep inclination of the shoulders 76 (see FIG. 3) at the rear of each protrusion 56, in combination with the stiffness of the spring free ends 78, causes the battery pack 36 to be urged forwardly in the latched position. This maintains a tight fit of the battery pack in the drill's handle with a step between the larger cross-section portion 44 and the intermediate portion 72 of the battery back being urged into firm abutting engagement with the outer end (i.e. lower end in FIG. 1) of the drill's handle 34. The shoulders 76 are inclined forwardly and outwardly at an angle of approximately 70 degrees to the longitudinal axis of the battery pack. This shoulder inclination angle is preferably in the range of 65 to 75 degrees. The steep inclination of the shoulders 76 is sufficiently steep to enable them to be effectively blocked by the spring free ends 78 in the latching position to prevent withdrawal of the battery pack, such withdrawal requiring the manual depression of the release member 64.

Due to the stiffness of the spring 58, the cam surfaces 88 of the release member 64 are inclined at an angle of 45 degrees to the direction of movement of the release member 64 when manually depressed and released. Preferably, this cam surface angle is in the range of 40 to 50 degrees.

FIGS. 6 to 9 show further details of the latch release member 64. The outer surface of the button 66 can be seen to have a non-slip surface such as provided by knurling. Each leg 84 has a skirt 96 on each side of the respective cam surface 88 and extending lengthwise to the inner end of the leg 84 (see FIGS. 8 and 9). This provides a guiding cavity 98 (FIG. 9) for the respective spring free end so ensuring that this spring free end remains in engagement with the release member 64, particularly the cam surfaces 88 thereof.

FIG. 10 illustrates another embodiment of the invention in which the above latching arrangement is employed to releasably latch the battery pack 36 in a battery pack charger 100 while the battery pack is being recharged. The charger 100 has conventional charging circuitry 102 with output electrical contacts 104 which are electrically engaged by the contacts 50 (FIG. 1) of the battery pack 36 when inserted into an appropriate cavity in the battery charger 100. A lead 106 is plugged into any suitable AC source of electricity for energizing the charging circuitry 102. The battery pack 36 is the same as that in FIGS. 1 to 5, and the various components of the latching arrangement are identical to those described in relation to FIGS. 1 to 9. The release button 66 is disposed at the top of the charger 100. With this embodiment, the battery pack is latched into the charger 100 while being recharged, and can only be withdrawn from the charger while fully depressing the release button 66 to disengage the retaining spring 58 (as shown in FIG. 5) from the shoulders 76 on the battery pack. A shoulder between the battery pack larger and intermediate portions 44, 72 (see FIG. 3) engages an end abutment surface of the charger housing (or drill handle 34) to limit inward movement of the battery pack during insertion and while latched in position by the free ends 78 of the spring (as shown in FIG. 3).

It will be appreciated that the above embodiments provide a simple, reliable, and easy to release latching arrangement for latching a battery pack in a portable handheld battery operated tool or other electric device including a battery pack charger.

Although the latching arrangement could be operated with only one spring leg, by having two spring legs engageable with protrusions on opposite sides of the battery pack, a preferred balanced latching arrangement is provided which holds the battery pack secure in two places.

It will also be appreciated that the single push button action is easy to use to release the battery pack, and that the battery pack can be snapped into position with a single inserting action.

Further, the above preferred latching arrangement is of simple design with only two movable components, the release member and the U-shaped spring.

In addition to latching the battery pack in position, it will also be noted that the latching arrangement may be employed to take up any tolerances between the battery pack and the electric device to ensure that the battery pack is a firm fit in the electric device.

It will further be noticed that in the drill embodiment, the latch release actuating button is conveniently located in the forward facing wall of the handle, yet spaced well below the trigger switch and hand grip portion of the handle to avoid inadvertent actuation.

The above described embodiments, of course, are not to be construed as limiting the breadth of the present invention. Modifications, and other alternative constructions, will be apparent which are within the spirit and scope of the invention as defined in the appended claims.

What is claimed is:

1. A latching arrangement for latching a battery pack in an electric device, comprising:
   a shoulder formed on a casing of the battery back;
   a displaceable limb mounted inside the electric device, the limb being resiliently biased towards said casing;
   a manually actuatable latch release member mounted in the electric device and movable between a latching position and a release position;
   said limb contacting said casing and blocking said shoulder in said latching position to latch said battery pack in the electric device; and
   said release member displacing said limb away from said casing and clear of said shoulder in said release position to unlatch said battery pack and allow withdrawal thereof from said electric device.

2. The latching arrangement of claim 1, wherein said shoulder is formed at an end of a protrusion on said casing, said protrusion having a ramp which is engaged by said limb to lift said limb over said protrusion when the battery pack is inserted into the electric device.

3. The latching arrangement of claim 1, wherein said limb is an arm of a U-shaped spring.

4. The latching arrangement of claim 1, wherein said release member comprises a yoke which straddles said casing.

5. The latching arrangement of claim 4, wherein said limb engages a cam surface on a leg of said yoke.

6. The latching arrangement of claim 5, wherein said limb is an arm of a U-shaped spring, a second arm of said spring blocking a second shoulder on said casing in said latching position, and said second arm engaging a second cam surface on a second leg of said yoke.

7. The latching arrangement of claim wherein said limb is an arm of a U-shaped spring which straddles said casing, said release member comprises a yoke which straddles said casing, and free ends of said U-shaped spring engage said yoke with said U-shaped spring and said yoke encircling said casing.

8. The latching arrangement of claim 1, wherein said casing has a gulley extending in a direction in which the battery pack is inserted into and withdrawn from the electric device, and said shoulder extends transversely across said gulley.

9. The latching arrangement of claim 1, wherein the electric device is a hand-held cordless power tool.

10. The latching arrangement of claim 9, wherein the power tool is a drill.

11. The latching arrangement of claim wherein the electric device is a charger for recharging the battery pack.

12. A latching arrangement for latching a battery pack in an electric device, comprising:
   two outwardly extending protrusions on opposite sides of a casing of the battery pack;
   a yoke-shaped latch release member slidably mounted in a housing of the electric device and having legs which straddle said casing;
   a spring mounted in said housing and having two limbs resiliently urged into engagement with said casing opposite sides adjacent said protrusions;
   said release member being slidable between a latched position in which said limbs block said protrusions and latch the battery pack in said housing, and a release position in which said battery pack can be withdrawn from said housing; and
   said legs engaging said limbs and moving said limbs apart in said release position.

13. The latching arrangement of claim 12, wherein said protrusions each have a shoulder and a ramp, each shoulder being blocked in said latched position by a respective one of said limbs, and each ramp causing the respective limb to be lifted over the respective protrusion when the battery pack is inserted into the electric device.

14. The latching arrangement of claim 12, wherein said legs have cam surfaces thereon which are engaged by free ends of said limbs and effect said moving said limbs apart.

15. The latching arrangement of claim 12, wherein said release member has a manually actuatable button which extends through said housing, said legs slidably engage between inwardly extending partitions of said housing, and free ends of said limbs engage in cavities in said legs.

16. The latching arrangement of claim 12, wherein said limbs have curved free ends which are urged into gulleys formed in opposite sides of said casing and extending in a direction in which the battery pack is inserted into and withdrawn from the electric device, and said protrusions bridge said gulleys.

17. A hand-held cordless electric tool, comprising:
   a housing having an electric motor therein;
   a battery pack removably insertable into said housing for supplying electrical power to said motor;
   a casing of said battery pack having two outwardly directed protrusions thereon on opposite sides thereof;
   each of said protrusions defining a shoulder;
   a U-shaped spring mounted in said housing, said spring having two limbs with free ends which are resiliently urged into contact with said casing juxtaposed said protrusions to block the shoulders thereof and latch the battery pack in the electric tool;
   a latch release member manually movable from a latching position to a release position, the release member having an actuation button protruding through said housing and a yoke straddling said battery pack;
   legs of said yoke having cam surfaces thereon engaged by said free ends thereby urging said release member into said latching position with said free ends blocking said shoulders; and
   said cam surfaces moving said free ends apart when said button is actuated to move said release member to said release position to unblock said shoulders and enable said battery pack to be withdrawn from said electric tool.

18. The electric tool of claim 17, wherein said protrusions have ramps extending away from said shoulders, said ramps lifting said free ends over said protrusions when the battery pack is inserted into the electric tool.

19. The electric tool of claim 18, wherein said cam surfaces are disposed in cavities in said legs, and said limb free ends are curved outwardly away from each other where they engage said cam surfaces.

20. The electric tool of claim 17, wherein said housing includes a piston grip handle having a trigger switch with an actuating trigger thereof on a forward side of said handle, and said actuating button extends through an orifice in said handle forward side.

21. A cordless electric device, comprising:
   a housing having an opening therein;
   a battery pack having a forward end releasably insertable into said housing through said opening, said battery pack being so insertable forwardly along a predetermined direction;
   said battery pack having a casing with a shoulder on a side wall thereof, said shoulder facing rearwardly with respect to said direction and being steeply inclined outwardly and forwardly with respect to said direction;
   a limb resiliently urged against said side wall juxtaposed but rearwardly of said shoulder to block said shoulder against rearward movement and so latch said battery pack in said housing when inserted therein;
   said resiliently urged limb also cooperating with said steeply inclined shoulder to urge said battery pack tightly into said housing;
   a ramp on said side wall forwardly of said shoulder and inclined inwardly and forwardly with respect to said direction, said ramp engaging said limb to lift said limb over said shoulder during insertion of said battery pack into said housing; and a latch release member movably mounted in said housing and manually actuatable to move said limb clear of said shoulder to unlatch said battery pack and enable withdrawal thereof from said housing.

22. The cordless electric device of claim 21, wherein said steeply inclined shoulder is inclined to said direction at an angle in the range of 65 to 75 degrees.

23. The cordless electric device of claim 22, wherein said ramp is inclined to said direction at an angle in the range of 10 to 25 degrees.

24. The cordless electric device of claim 21, wherein said limb is part of a spring.

25. The cordless electric device of claim 21, wherein said battery pack casing side wall includes a step, and said cooperating of said limb with said steeply inclined shoulder urges said step against a portion of said housing surrounding said opening.

* * * * *

UNITED STATES PATENT AND TRADEMARK OFFICE
CERTIFICATE OF CORRECTION

PATENT NO. : 4,871,629

DATED : October 3, 1989

INVENTOR(S) : Bunyea

It is certified that error appears in the above-identified patent and that said Letters Patent is hereby corrected as shown below:

In Claim 7: at column 7, line 13, change "claim" to --claim 1,--.

In Claim 11: at column 7, line 28, change "claim" to --claim 1,--.

Signed and Sealed this

Seventh Day of August, 1990

Attest:

HARRY F. MANBECK, JR.

*Attesting Officer*        *Commissioner of Patents and Trademarks*